United States Patent
Reardon et al.

(10) Patent No.: US 6,213,006 B1
(45) Date of Patent: Apr. 10, 2001

(54) COOKING APPARATUS

(76) Inventors: Lee J. Reardon, 5207 Quarrystone La., Tampa, FL (US) 33624; Robert van de Ven, Neuhaltenring 1, Ebikon (CH), 6030

(*) Notice: Subject to any disclaimer, the term of this patent is extended or adjusted under 35 U.S.C. 154(b) by 0 days.

(21) Appl. No.: 09/603,782

(22) Filed: Jun. 26, 2000

(51) Int. Cl.[7] .............................. A47J 37/00; A47J 37/04; A47J 37/07
(52) U.S. Cl. ........................... 99/446; 99/340; 99/400; 99/401; 99/444; 99/447; 99/450; 99/482; 126/9 R; 126/25 R
(58) Field of Search ........................ 99/339, 340, 400, 99/401, 444–450, 481, 482, 476; 126/25 R, 9 R, 41 R; 219/400, 401

(56) References Cited

U.S. PATENT DOCUMENTS

| | | | |
|---|---|---|---|
| 2,253,833 | * | 8/1941 | Volks ........................................ 99/446 |
| 2,413,204 | * | 12/1946 | Wolff ...................................... 99/447 X |
| 3,987,719 | * | 10/1976 | Kian ........................................ 99/444 |
| 4,373,511 | * | 2/1983 | Miles et al. ............................ 126/25 R |
| 4,773,319 | | 9/1988 | Holland . |
| 4,800,865 | * | 1/1989 | Setzer ................................... 99/401 X |
| 4,909,137 | | 3/1990 | Brugnoli . |
| 4,922,079 | * | 5/1990 | Bowen et al. ........................ 99/446 X |
| 5,097,753 | * | 3/1992 | Bowen et al. ........................ 99/400 X |
| 5,107,096 | * | 4/1992 | Knees ...................................... 99/446 |
| 5,313,877 | * | 5/1994 | Holland ................................ 99/447 X |
| 5,351,068 | * | 9/1994 | Muchin ................................ 99/339 X |
| 5,431,091 | * | 7/1995 | Couture ................................ 99/447 X |
| 5,649,477 | | 7/1997 | Lingwood . |
| 5,782,165 | * | 7/1998 | Glenboski et al. .................... 99/340 |
| 5,873,300 | * | 2/1999 | Kuhlman ............................. 99/422 X |

OTHER PUBLICATIONS

Brochure Entitled:"From Grill to Gourmet" 8 pages in Fold–Out Format, Distributed by : Outdoor Chef International, Ebikon, Switzerland, updated.

* cited by examiner

Primary Examiner—Timothy F. Simone

(57) ABSTRACT

A cooking apparatus especially useful as an outdoor portable barbecue grill wherein a housing has a heat source at the bottom thereof, a cooking grate or griddle at the top thereof and a heat-funnel disposed between the heat source and the cooking grate. The heat-funnel, in turn, is removably positioned in relation to a separate grease deflector or drip shield member to provide an air gap between the two units. Heated air from the heat source flows upwardly around the grease deflector, passes through the gap to enter the heat-funnel member which is constructed in such a manner to direct the heated air stream directly upon the cooking grate undersurface. The heat-funnel and grease deflector members are configured and arranged in a unique stacked array inside the grill housing so as to divert food grease or other drippings emanating from the cooking grate away from the heat source all of the while promoting the flow of heated air directly upon substantially the entire cooking grate undersurface during the cooking cycle.

26 Claims, 8 Drawing Sheets

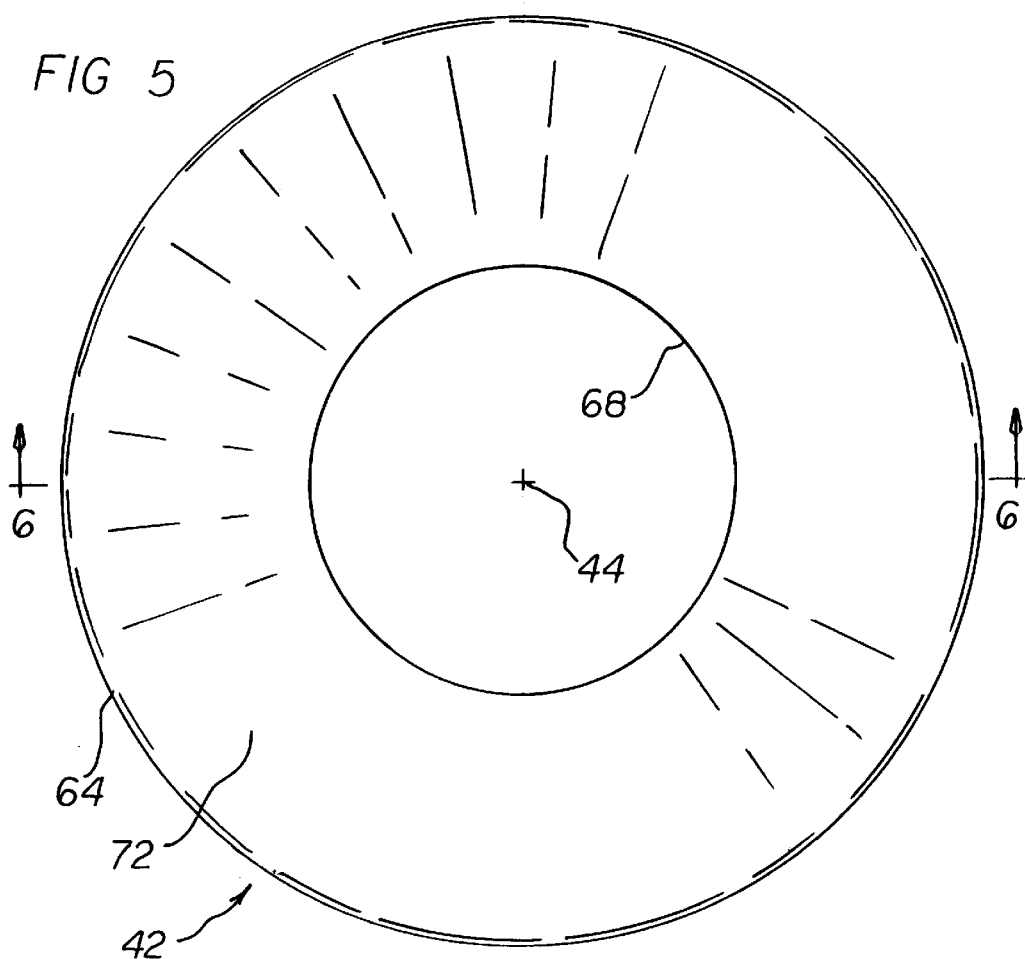
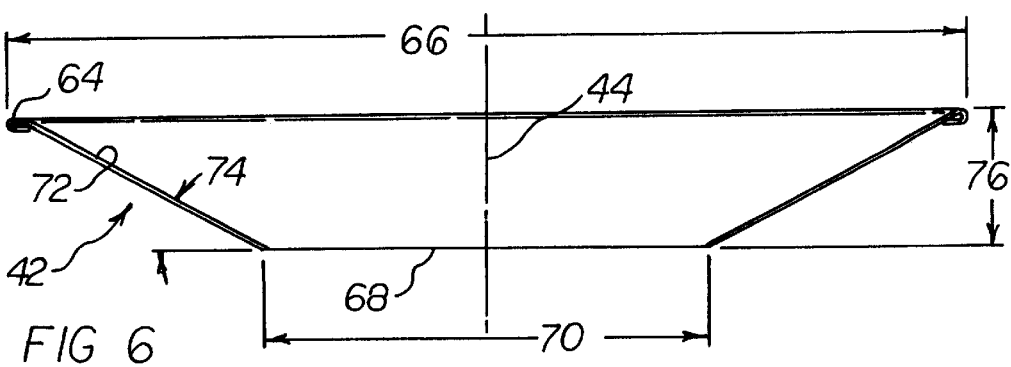

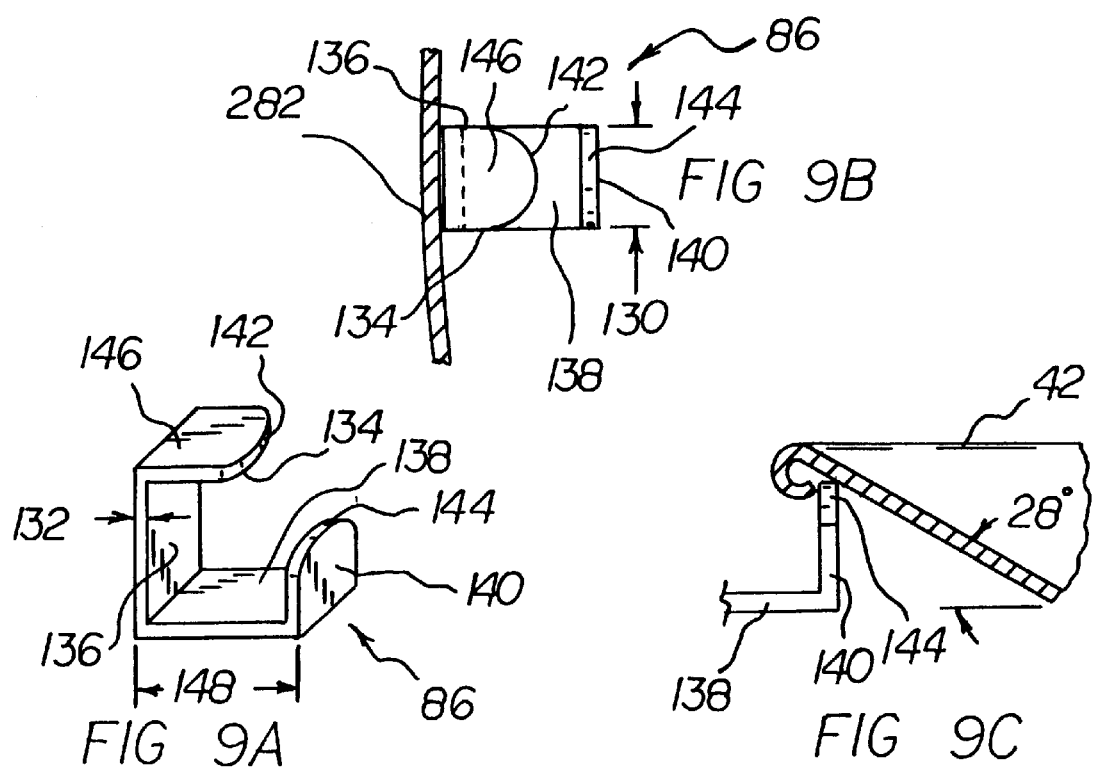
FIG 9B
FIG 9A
FIG 9C
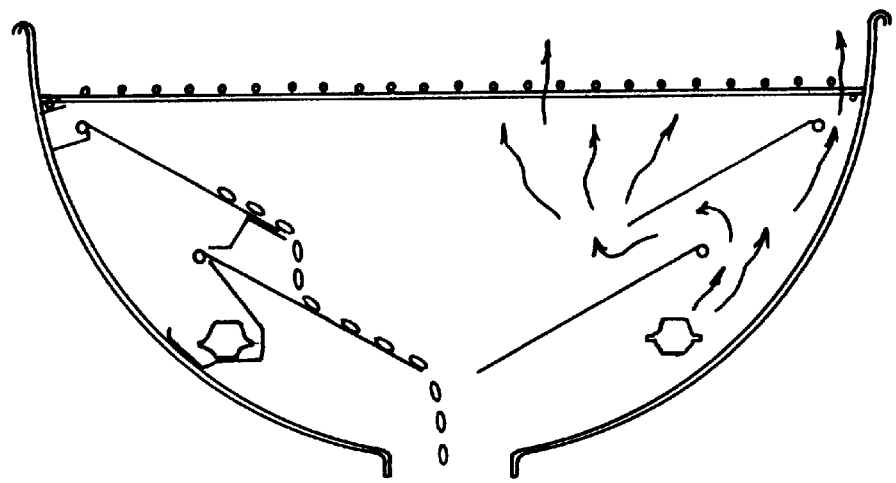
FIG 11

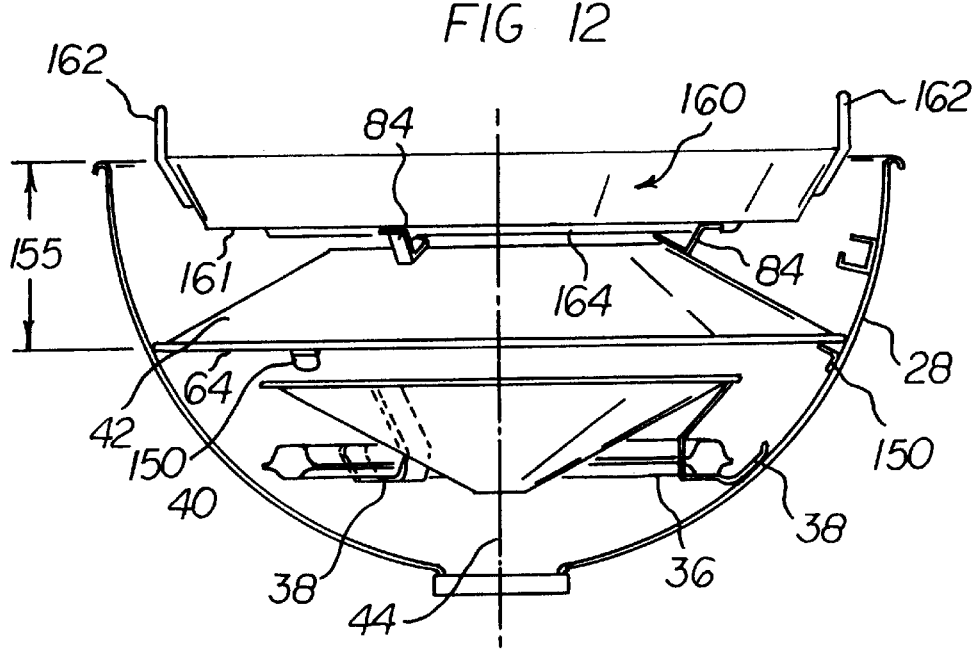
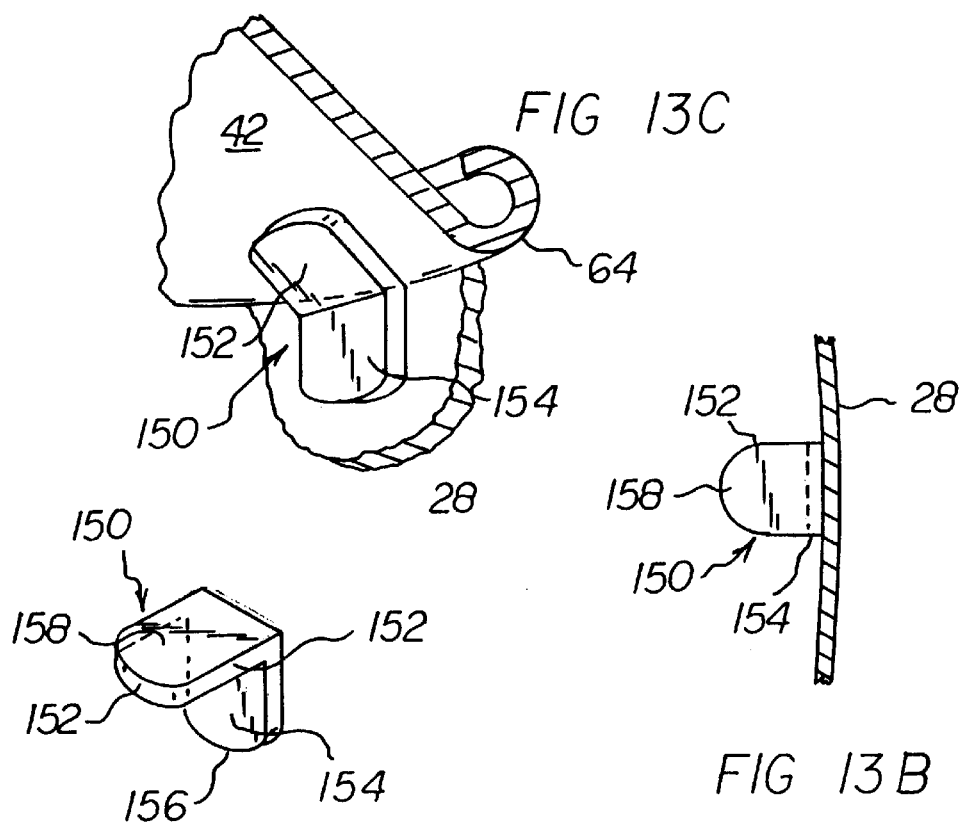

COOKING APPARATUS

BACKGROUND OF THE INVENTION

1. Field of the Invention

The present invention relates generally to improvements in portable outdoor cooking grills, and more particularly, to an improved portable outdoor cooking grill apparatus capable of directing the flow of heated air interiorly of the grill housing to promote more rapid and uniform cooking of food placed thereon all of the while preventing food grease, fat or other drippings from coming into contact with the grill's heat source.

2. Description of the Prior Art

A common feature in portable outdoor grills (e.g. barbecue grills) is the use of a drip pan or grease catcher to prevent flame ups or grease fires. In U.S. Pat. No. 4,773,319 (Holland) there is disclosed a portable outdoor barbecue grill having a housing, a food support shelf or cooking grate, a heat source or burner at the bottom of the housing, a heat deflector positioned above the burner, and a grease collector or drip pan disposed between the heat deflector and the cooking grate. The drip pan in turn, has inclined rectangular sides joined to an inclined trough or channel medially thereof. At the lowermost end of the trough is a downspout terminating in a valve for collecting and discharging grease, drippings, and so on, through the bottom of the housing.

In U.S. Pat. No. 4,909,137 (Brugnoli) the grease catcher is provided in the form of a pan located underneath the cooking grate or food support shelf wherein the pan includes a spout for channeling the grease or other drippings into a conduit feeding a reservoir located underneath the grill's gas burner. The drip pan is substantially the same size as and is substantially coextensive with the cooking surface defined by the grate.

In U.S. Pat. No. 5,649,477 (Lingwood) there is disclosed a bowl-shaped drip pan or grease collector disposed between the cooking grate and the burner or other heat source.

It will be observed that in each of the foregoing patented cooking devices, the provision of the grease catcher or drip pan requires that the heated air from the burner or other heat source must travel upwardly and around the grease pan to reach the cooking surface. As a result, the heated air flow-stream is concentrated in a relatively narrow annulus between the periphery of the grease pan and the outer wall of the grill housing. This, in turn, results in non-uniform impingement of heated air onto the cooking griddle or food support grate. The bottom of the food being cooked on the grate is heated indirectly for the most part by radiated heat from the grease collecting drip pan whereas the top of the food is heated more directly by heated air circulating around the sides of the drip pan, the inside surface of the grill's top or cover, until finally, the heated air impacts the top surface or upper regions of the food being cooked on the grate. This state of affairs prolongs the cooking process, often results in non-uniform cooking, and requires the food to be manually turned frequently on the grate to assure that it is adequately "done on both sides." Against this prior art background, it would be desirable if means were provided to enable heated air from the grill's heat source to be distributed directly and uniformly along the underside of the cooking griddle substantially throughout the griddle's horizontal extent, without impairing the important function of a grease collector or drip pan disposed between the heat source and the griddle in order to safeguard against flame ups or grease fires.

Thus, while the foregoing body of prior art indicates it to be well known to use grease collectors or drip pans in portable outdoor cooking appliances, such as in barbecue grills or the like, the prior art described above does not teach nor suggest a cooking apparatus which includes means for enabling the flow of heated air upwardly from a heat source in a housing so that it is will impinge directly upon the underside of a cooking grate substantially throughout the horizontal extent thereof and which at the same time functions to divert grease or other drippings falling from the cooking surface away from the grill's heat source thereby preventing unwanted flame ups or grease fires. This long felt need and vexing problem has been uniquely solved by the present invention, as will be made apparent from the following description thereof. Still other objects and advantages attained by the present invention will be rendered evident from the following detailed description thereof.

SUMMARY OF THE INVENTION

To achieve the foregoing and other objects and advantages, the present invention, briefly described, provides a cooking apparatus especially useful as an outdoor portable barbecue grill wherein a housing has a heat source at the bottom thereof, a cooking grate or griddle at the top thereof and a heat-funnel disposed between the heat source and the cooking grate. The heat-funnel, in turn, is removably positioned in relation to a separate grease deflector or drip collector member to provide an air gap between the two units. Heated air from the heat source flows upwardly around the grease deflector, passes through the gap to enter the heat-funnel member which is constructed in such a manner to direct the heated air stream directly upon the cooking grate undersurface. The heat-funnel and grease deflector members are configured and arranged in a unique stacked array inside the grill housing so as to divert food grease or other drippings emanating from the cooking grate away from the heat source all of the while promoting the flow of heated air directly upon substantially the entire cooking grate undersurface during the cooking cycle.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining preferred embodiments of the invention in detail as required by statute, it is understood that the invention is not to be limited to the details of the construction and to the arrangements of the components set forth in the following description or illustrated in the drawings. The invention is capable of other embodiments and of being practiced and carried out in various and sundry ways. Also, it is to be understood, that the phraseology and terminology employed herein are for the purpose of description and should not be regarded as limiting.

It is therefore an object of the present invention to provide a new and improved cooking grill apparatus which has all of the advantages of the prior art and none of the disadvantages.

It is another object of the present invention to provide a new and improved cooking grill apparatus which may be easily and efficiently manufactured and marketed.

It is a further object of the present invention to provide a new and improved cooking grill apparatus which is of durable and reliable construction.

An even further object of the present invention is to provide a new and improved cooking grill apparatus which is cost effective to manufacture, and which therefore is susceptible of being placed on sale to the consuming public at relatively low prices, thereby making such apparatus readily available to the buying public.

It is yet another object of the present invention to provide a new and improved cooking grill apparatus that is capable of safely and efficiently cooking food of many different types.

It is another object of the present invention to provide an improved cooking grill apparatus that is capable of producing flavorful, uniformly cooked food in a minimum of time using a minimum of fuel.

It is still another object of the present invention to provide an improved outdoor cooking grill apparatus that provides more rapid cooking of a variety of foods without undue risk of flame ups or grease fires.

It is yet another object of the present invention to provide an improved outdoor cooking grill apparatus that operates under the principle that the most rapid mode of cooking is to channel heated air from a heat source directly onto the underside of the food cooking surface, rather than to rely upon convection or radiated heat.

Yet still a further object of the present invention is to provide a new and improved barbecue grill or the like having a heat source and a cooking grate and which despite including means for safely diverting grease or other drippings emanating from the cooking grate away from the grill's heat source, also includes means for assuring that heated air from the heat source directly impinges substantially against the entire undersurface of the grill's food grate.

These together with still other objects of the present invention, along with the various features of novelty which characterize the invention, are pointed out with particularity in the claims annexed to and forming a part of this disclosure. For a better understanding of the invention, its operating advantages and the specific objects attained by its uses, reference should now be had to the following more detailed description and accompanying drawings in which there are described and illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 5 is a plan view of a heat-funnel member according to the present invention.

FIG. 6 is a sectional view taken along line 6—6 in FIG. 5.

FIG. 9A is an isometric view of a heat-funnel member edge engagement bracket assembly according to the present invention.

FIG. 9B is a top plan view of the bracket assembly of FIG. 9A showing it attached to the inside surface of a fragmentary wall portion of the housing of the cooking apparatus according to the invention.

FIG. 9C is an enlarged plan view of a fragmentary portion of the heat-funnel member edge in engagement with a fragmentary portion of the bracket assembly of FIGS. 9A and 9B.

FIG. 11 is a schematic version of FIG. 2 showing heat flow and drip collection functionality according to the present invention.

FIG. 12 is a schematic cross-sectional elevational view of an alternatively preferred embodiment of the cooking apparatus according to the present invention.

FIG. 13A is a top isometric view of an angle bracket employed in connection with the alternatively preferred embodiment of FIG. 12.

FIG. 13B is a top plan view of angle bracket of FIG. 13A showing it attached to the inside surface of a fragmentary wall portion of the housing of the cooking apparatus according to the invention.

FIG. 13C is a bottom isometric view of the angle bracket of FIGS. 13A and 13B showing a fragmentary portion of the heat-funnel of the invention being supported on the top ledge portion thereof.

DESCRIPTION OF THE PREFERRED EMBODIMENT

With reference to the drawings, a new and improved cooking apparatus embodying the principles and concepts of the present invention will be described.

Figure 1:
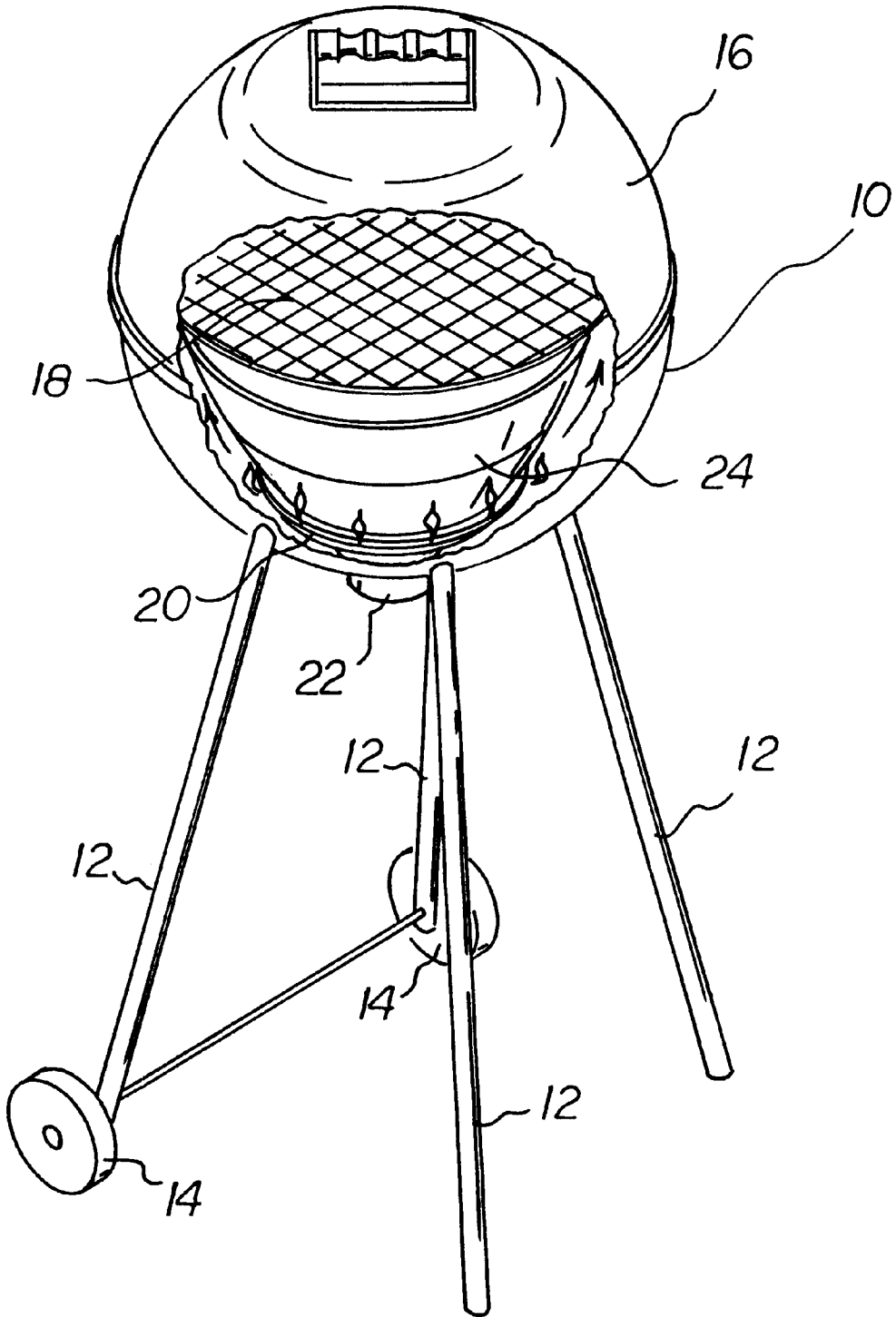
FIG. 1 is an isometric schematic view of a prior art portable outdoor cooking appliance shown partially broken away.

Before describing in detail the preferred embodiment(s) of the present invention, it might be helpful to the reader to first describe the general characteristics of a typical prior art cooking apparatus over which the present invention is a considerable improvement. Thus, turning to FIG. 1, there is schematically shown a portable outdoor barbecue having a semi-globular-shaped housing 10, struts 12 and wheels 14, and a domed removable top 16. A horizontally disposed perforated griddle or grate 18 defining a food support shelf or cooking surface is suitably removably held in place at the upper reach of housing 10. Suitably supported near the bottom of the interior of housing 10 is an annular-shaped burner 20 of the gas type with the usual gas-supply line and canister of bottled gas not being shown for the sake of brevity. At the bottom of housing 10 is a removable drip cup 22 for receiving grease or other drippings. Disposed between the annular burner and the grate is a bowl-shaped drip collector assembly 24. In operation, heated air from the burner rises around the outside of the drip collector assembly 24 and flows through the relatively narrow annular clearance space between the drip collector assembly's upper extremity and the confronting inner wall surface of housing 10. It is thus seen that the upwardly flowing, heated air normally is substantially blocked from impinging upon the undersurface of the central region of food grate 18. Heat impacting this region usually is radiated from the drip collector assembly, an inefficiency which results in relatively non-uniform heat distribution at the plane of the cooking surface than otherwise would be desired. The foregoing prior art cooking device is very similar to that distributed commercially by Outdoor Chef International, Ltd., Ebikon, Switzerland.

Turning now to FIGS. 2–6, there is shown a first embodiment of the cooking apparatus of the invention employed as a portable outdoor cooker of the so-called "barbecue grill" style generally designated by reference numeral 26. Outdoor cooker 26 may include the usual domed top, strut and wheel assemblies, gas lines and gas supply; however, because these components form no part of the present invention and are well known in the art, they have been omitted for the sake of simplifying the presentation and to avoid obfuscating the drawings.

Figure 2:
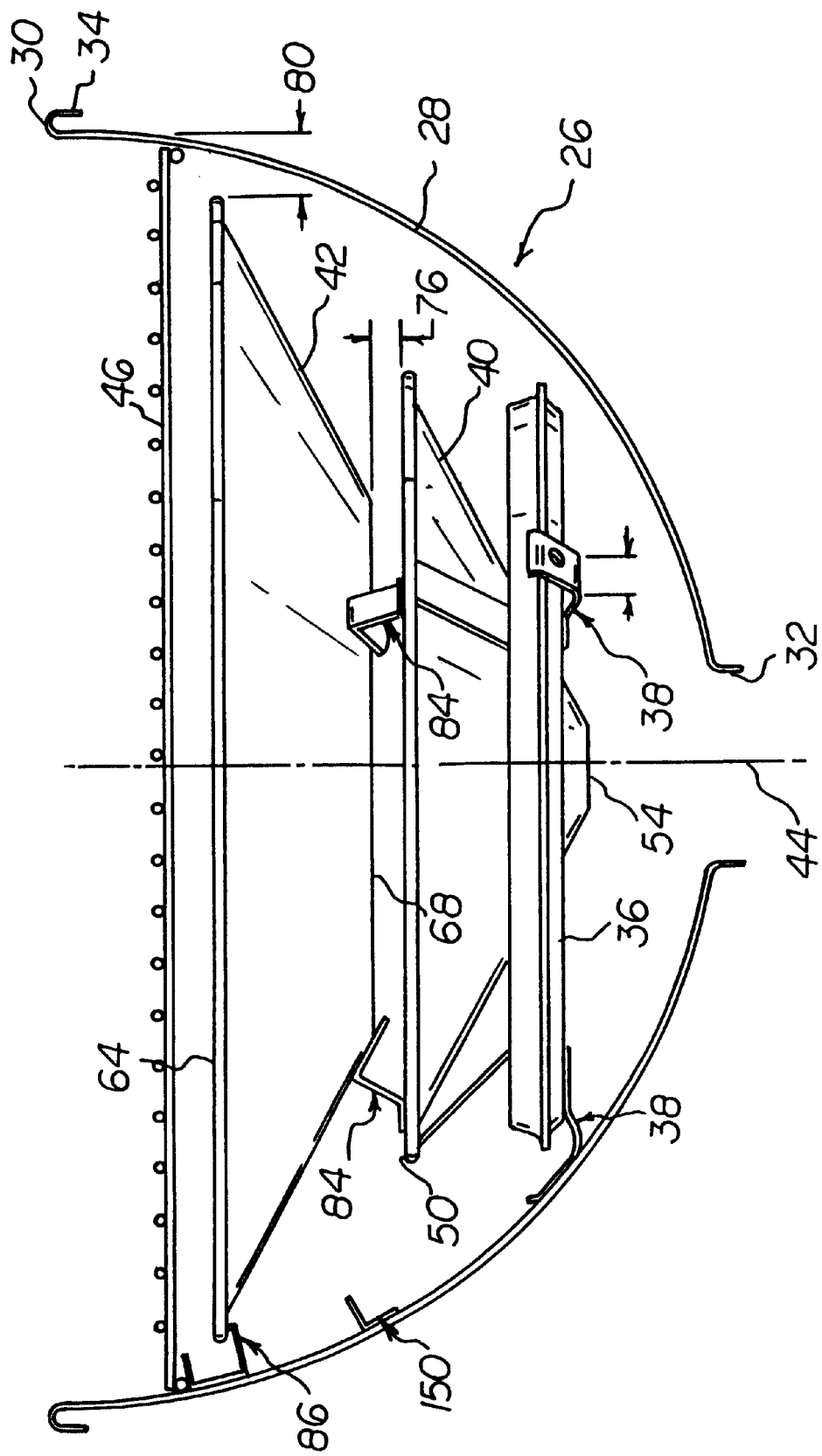
FIG. 2 is a schematic cross-sectional elevational view of a preferred embodiment of the cooking apparatus according to the present invention.

An hollow housing 28 of generally semi-globular shape, preferably fabricated of vitreous enamel steel, extends from a top edge 30 to a bottom central opening 32 substantially as shown (FIG. 2) to define a cooking chamber. Top edge 30 preferably is rolled or beaded to form a radially outwardly extending circumferential flange 34. A generally donut-shaped (annular) gas burner 36 of known construction is horizontally supported within the cooking chamber near the bottom thereof by a series of circumferentially spaced bracket assemblies 38 so as to be disposed proximal to and concentric with bottom central opening 32 substantially as depicted in FIG. 2. A grease deflector or drip shield member 40 is disposed above and concentric with annular burner 36 whereas a separate heat-funnel member 42 is disposed above and concentric with the grease deflector member 40. As a result of this stacked array arrangement, the annular burner 36, grease deflector member 40, and heat-funnel member 42 are in axial alignment with respect to an imaginary vertical axis 44 passing centrally through the bottom opening 32 of housing 28. A suitably perforated removable grillwork, griddle or grate 46 defining a food cooking surface is horizontally supported above the foregoing stacked array in a manner to be described in more detail below. Imaginary axis 44 generally is normal to an imaginary plane passing horizontally through griddle 46.

Figure 3:
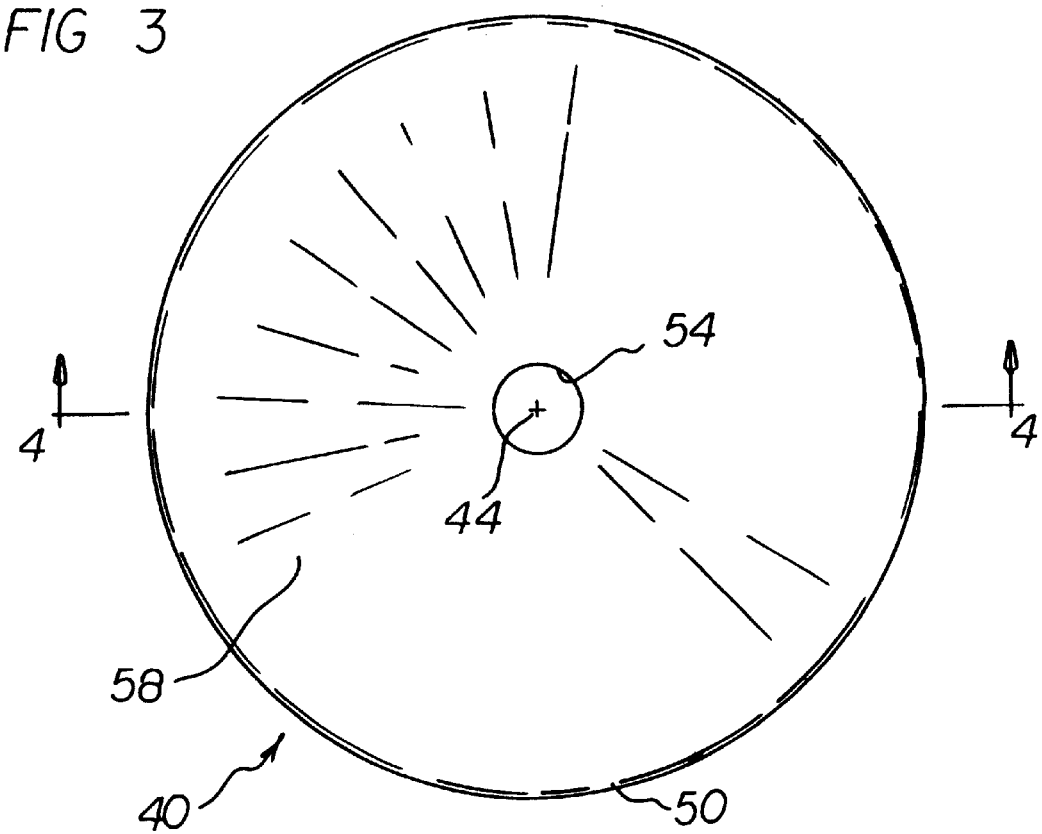
FIG. 3 is a plan view of a grease deflector member according to the present invention.
Figure 4:
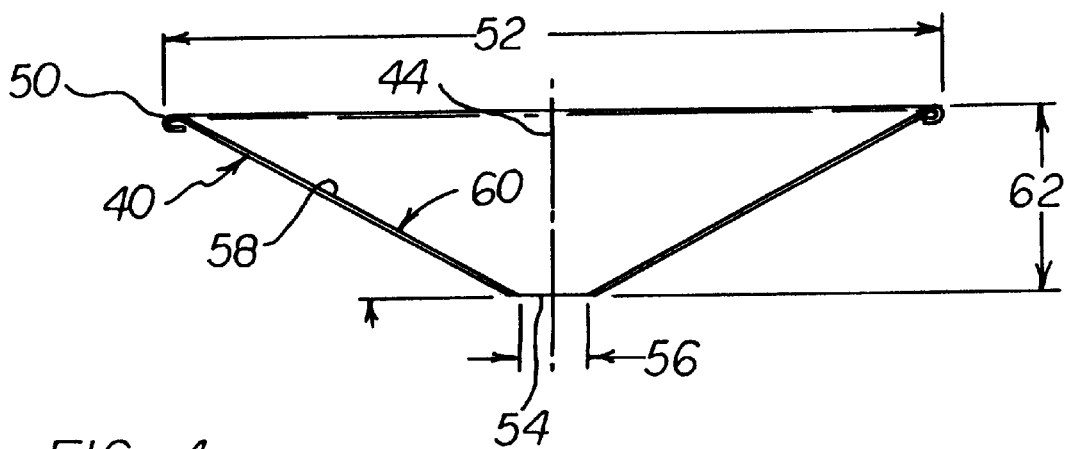
FIG. 4 is a sectional view taken along line 4—4 in FIG. 3.

Each of the members 40, 42 is similarly configured albeit differently dimensioned. As best illustrated in FIGS. 3 and 4, grease deflector member 40 generally is in the form of a conically-shaped pan and has a rolled or beaded top edge 50 defining a circular top opening having a transverse extent or diameter 52, a bottom edge 54 defining a circular bottom opening having a transverse extent or diameter 56, and a frusto-conical sidewall 58 extending between top edge 50 and bottom edge 54. The rolled or beaded top edge 50 forms a radially outwardly extending circumferential lip (not labeled). In accordance with the invention, the inclination angle 60 that sidewall 58 makes with respect to a horizontal reference is substantially less than 30°, with an angle of 28° being mostly preferred. The grease deflector member 40 has a height dimension 62 extending between top edge 50 and bottom edge 54. It will be noted especially in FIG. 2 that the grease deflector member 40 essentially overlies completely the annular burner 36 so as to be able to intercept any grease, fat or other food drippings emanating from griddle 46 and divert same through bottom opening 32 of the housing 28.

Turning to FIGS. 5 and 6, heat-funnel member 42 also generally is in the form of a conically-shaped pan and has a rolled or beaded top edge 64 defining a circular top opening having a transverse extent or diameter 66, a bottom edge 68 defining a circular bottom opening having a transverse extent or diameter 70, and a frusto-conical sidewall 72 extending between top edge 64 and bottom edge 68. Here again, the rolled or beaded top edge 64 forms a radially outwardly extending circumferential lip (not labeled). In accordance with the invention, the inclination angle 74 that sidewall 72 makes with respect to a horizontal reference is the same as or less than that of grease deflector member 40, i.e. angle 74 is substantially less than 30°, with an angle of 28° being mostly preferred. The heat-funnel member 42 has a height dimension 76 extending between top edge 64 and bottom edge 68.

In the preferred embodiment, the heat-funnel member 42 is slightly less tall (i.e. measured along imaginary axis 44) than is grease deflector member 40, but is substantially greater in transverse extent (i.e. wider as measured along a perpendicular to imaginary axis 44). The ratio of the diameter 66 of the top opening of heat-funnel member 42 to the diameter 52 of the top opening of grease deflector member 40 is about 1.5:1 whereas the ratio of the diameter 70 of the bottom opening of heat-funnel member 42 to the diameter 56 of the bottom opening of the grease deflector member 40 is about 9:1. Preferably, members 40 and 42 also may advantageously be fabricated of vitreous enamel steel. While the primary purpose of heat-funnel member 42 is to direct the flow of heated air upward toward the grate 46, and therefore the diameter of bottom opening 68 is substantially enlarged to accommodate this purpose, there is some radial overlap between the frusto-conical sidewall 72 and frusto-conical sidewall 58; accordingly, as schematically shown in FIG. 11, any food grease, fat or other particles falling onto sidewall 72, if not vaporized by the relatively high temperature of the heated airflow streaming through heat-funnel member 42, will "run off" and be collected by grease deflector 40. Because of the relatively large transverse extent of the bottom opening 68 of heat-funnel member 42, and the high axial mounting position of this member relative to annular burner 36, heat-funnel member 42 in and by itself would not be effective to prevent drippings from the food being cooked on grate 46 from falling onto heat source 36. In the present invention, that function is performed exclusively by grease deflector member 40 (i.e. prevent drippings from the food being cooked on grate 46 from falling onto heat source 36).

Generally speaking, too steep an angle of inclination of a grease deflector or grease collecting pan in a barbecue grill will result in insufficient vaporization because the dripping particles tend to run off too quickly; consequently, there is a likelihood of insufficient barbecue flavor being imparted to the cooking food. On the other hand, too shallow an angle of inclination is undesirable because the dripping food particles tend to remain in situ increasing the risk of a grease fire or flame up. In the present invention, it has been discovered that a relatively shallow inclination angle for the grease deflector and the heat-funnel member, i.e. substantially less than 30° with respect to a horizontal reference (i.e. mostly preferred 28°), produces an optimum balance between vaporization and "run off" velocity. It has been found after numerous examples of using the apparatus of the present invention to cook various foods that excellent barbecue flavor is imparted to the food and little or no residue tends to remain in either the heat-funnel member 42 or the grease collector 40. It is speculated that the foregoing advantage results from the fact that the unique stacked array arrangement of the present invention facilitates greater efficiency and higher cooking temperatures for a given heat source especially in the interior region of the heat-funnel member 42 due to the flow of heated air therethrough. It is theorized that higher temperatures in this region result in greater viscosity of food grease particles and thereby more rapid flow of same despite a relatively shallow inclination angle. With respect to the grease deflector member 40, operating temperatures normally are lower in this region, and therefore, despite the relatively shallow inclination angle employed therein, no adverse consequences with respect to the potential for flame up or grease fire are to be expected, even if drip flow velocity is reduced somewhat.

An important feature of the present invention is the presence of an annular air flow gap defined by the axial spacing (measured along axis 44) between the bottom edge 68 of heat-funnel 42 and the top edge 50 of grease deflector member 40. As shown in FIG. 2, the annular air flow gap has a dimension 76. As best seen in FIG. 2 and the schematic depiction of FIG. 11, the annular air flow gap 76 permits heated air to flow around the outer sidewall of the grease deflector member 40, enter the interior of heat-funnel 42 through the bottom opening thereof defined by edge 68 where, as indicated schematically by the arrows in FIG. 11, the heated air flows upwardly inside heat-funnel 42 to directly impinge upon the central undersurface region of grate 46 encompassed by the top edge opening 64 of the heat-funnel. Hence, by the foregoing arrangement, heated air flow is distributed more uniformly across the entire transverse extent of the understrface of grate 46, and is not concentrated merely in the annular clearance space 80 between the periphery of the top edge 64 of the heat-funnel member 42 and the confronting surface on the interior sidewall of the housing 28, as is the case in the prior art arrangements.

In accordance with the present invention, the annular burner 36, grease deflector member 40 a heat-funnel member 42 are maintained in their intended stacked array formation substantially as shown in FIG. 2 by utilizing novel hardware components comprising the aforementioned bracket assembly 38 in conjunction with a heat-funnel stabilizing foot bracket assembly generally indicated by reference sign 84, and a heat-funnel member edge engagement bracket assembly generally indicated by reference sign 86 (FIG. 2). Each of these components preferably is made of the same material as the heat-funnel members and the housing (e.g. vitreous enamel steel) and each now will be described in detail by referring to FIGS. 7–9A–C, respectively.

Figure 7:
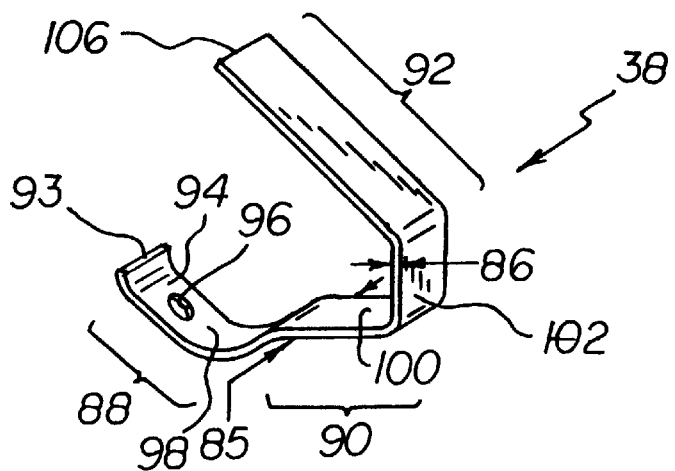
FIG. 7 is an isometric elevational view of a burner/grease deflector support bracket assembly according to the present invention.

Turning initially to FIG. 7, each burner/grease deflector bracket assembly 38 comprises a unitary member having a uniform width dimension 85 and a uniform thickness dimension 86. The bracket assembly 38 has three different sections, namely, a housing wall attachment section 88, a burner support section 90, and a grease deflector member top edge receiving finger section 92. Housing wall attachment section 88 comprises a slightly turned-up distal end 93 joined to a flat housing wall attachment portion 94 having therein a rivet or fastener reception hole 96. The flat portion 94, in turn, is joined to a curved transition portion 98 which latter is joined to a first portion 100 of burner support section 90. A second or riser portion 102 of burner support section 90 extends orthogonally with respect to first portion 100 and eventually joins grease deflector member top edge receiving finger section 92 which in turn, extends at an angle of about 45° to the axis of riser portion 102. By this arrangement, the distal end edge 106 of section 92 reposes at an elevated location above transition region 98 substantially as illustrated in FIGS. 2, 7 and 11.

In accordance with the present invention, and as can best be seen in FIGS. 2 and 11, first portion 100 serves as a supporting bracket or surface for a confronting portion of burner 36; section 88 serves as an attachment bracket or surface with respect to the inside wall surface of housing 28 by means of a suitable rivet or other fastener adapted to be received in hole 96 and a confronting suitable hole (not labeled) in the housing sidewall; and section 92 serves as a supporting bracket or finger for grease deflector member 40 by facilitating receiving engagement of the grease deflector's beaded top edge 50 on distal end edge 106. It will be appreciated that during assembly of the cooking apparatus of the invention, burner 36 is first suitably attached to section 100; portion 94 then is suitably fastened to the sidewall of housing 28; and next grease deflector member 40 is placed in the position shown in FIGS. 2 and 11 merely by placing the beaded or rolled top edge 50 thereof suitably in position to rest on and engage the distal edge(s) 106 of portion(s) 92. Grease deflector member 40 thus is removably supported in position (FIGS. 2 and 11), i.e. this component may easily be removed for cleaning or replacement by lifting it up and dis-engaging the rolled top edge 50 thereof from the distal end edge(s) 106 of portion(s) 92.

Figure 8:
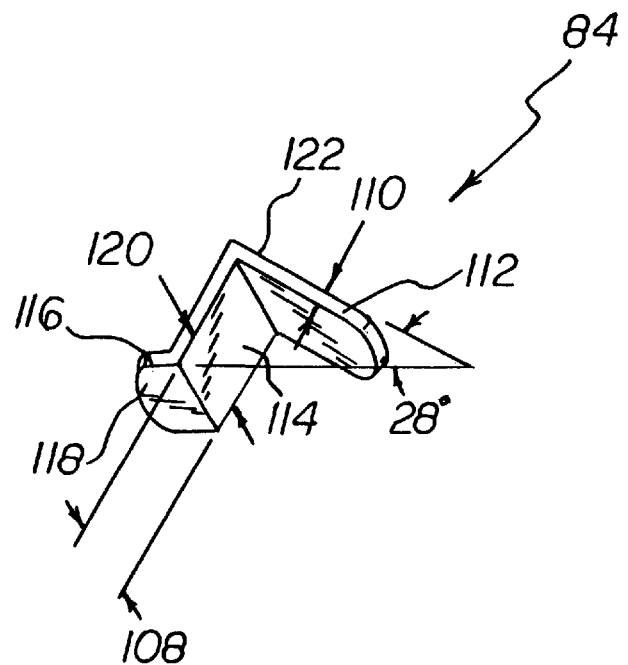
FIG. 8 is an isometric elevational view of a heat-funnel stabilizing foot bracket assembly according to the present invention.

In accordance with yet another feature of the invention, the heat-funnel member 42 is adapted to be removably maintained in position between the grease deflector member 40 and the food grate or griddle 46 by means of two other hardware components namely, the heat-funnel stabilizing foot bracket assembly 84, and the heat-funnel member edge engagement bracket assembly 86. As illustrated in FIGS. 8, each heat-funnel stabilizing foot bracket assembly 84 also comprises a unitary member having a uniform width dimension 108 and a uniform thickness dimension 110. The foot assembly 84 is characterized further by a heat-funnel attachment portion 112 joined orthogonally to an intermediate leg portion 114 which latter in turn, has joined to it an angularly extending foot portion 116 defining a bottom flat bearing surface 118. The angle 120 between the foot portion 116 and the leg portion 114 is complementary to the inclination angle of the heat-funnel member's sidewall. Hence, if the sidewall angle is about 28° with respect to a horizontal reference as measured in FIGS. 2 and 11, then angle 120 is about 62°. The attachment portion 112 has a top flat attachment surface 122 which is adapted to be attached to a confronting surface portion on the heat-funnel member proximal to the heat-funnel member's bottom edge 68 (FIGS. 2 and 11) as by spot welding or other known attachment process. When so attached, the foot portion 116 extends parallel to a horizontal reference (see FIGS. 2, 8 and 11) and the bottom flat bearing surface 118 faces downwardly. By this arrangement, the heat-funnel member 42 may be placed in the position shown in FIGS. 2 and 11 such that the bottom flat bearing surface 118 of foot portion 116 engages the rolled top edge 50 on grease deflector member 40. Hence, the foot assembly 84 serves as a stabilizing bracket element maintaining the axial extent of the airflow gap 76 between the axially separated heat-funnel member and grease deflector member 40 in the stacked array sufficiently to assure desired flow of heated air during the cooking cycle as contemplated by the present invention.

Whereas the foot assembly components 84 are quite capable of supporting the heat-funnel member 42 in its desired operable position resting on the top edge of the grease deflector member 40, but elevated therefrom substantially as depicted in FIGS. 2 and 11, further support may be given to the stacked array via the additional use of the heat-funnel member edge engagement bracket assemblies 86. Thus, turning to FIGS. 9A–9C, each heat-funnel member edge engagement bracket assembly 86 comprises a unitary, generally C-shaped member having a uniform width 130, a uniform thickness 132, and is further characterized by four separate portions each arranged orthogonally with respect to its neighbors. Thus, first portion 134 is joined to an orthogonally extending second portion 136, which in turn, is joined to an orthogonally extending third portion 138 which in turn, is joined to an orthogonally extending fourth portion 140. Preferably, first and fourth portions 134 and 140 terminate in a curved or semi-circular shaped distal end edge 142 and 144, respectively. The first portion 134 furthermore has a top surface 146 facing upwardly when the bracket assembly is suitably attached to the inside surface of housing 28 proximal to the top edge 30 thereof. When so attached (see FIGS. 2 and 11), top surface 146 is adapted to receive in supporting relation thereon the rim of removable food griddle or grate 46. As depicted, second portion 136 advantageously is used to fixedly attach the bracket assembly 38 to a confronting portion of the inside wall surface of housing 28, as by spot welding, for example. In the attached condition, third portion 138 extends orthogonally from its juncture with second portion 136 interiorly of housing 28 toward imaginary axis 44 a transverse distance 148 until it is terminated by fourth portion 140 orthogonally extending upwardly therefrom. Fourth portion 144 defines a tab or finger whose distal end edge 144 is adapted to engage the rolled or beaded top edge 64 of heat-funnel 42 when the latter is placed in position substantially as shown in FIGS. 9C, 2 and 11. By this action, fourth portion 144 positively locates and further supports the heat-funnel 42 in its intended concentric top position in the stacked array. It will be observed moreover, that the third portion's transverse dimensional extent (i.e. dimension 148) defines the annular clearance space or gap 80 between the greatest transverse extent of the heat-funnel 42 and the inside surface of housing 28 through which space heated air emanating from burner is adapted to flow. By assuring that heated air flows through the annular clearance gap 80 as well as through the interior of the heat-funnel 42 in accordance with the present invention, when the oven has its usual domed top cover in place, substantially uniform heat is applied to both the top and bottom of the food being cooked on food grate 46 thereby promoting more rapid cooking than would otherwise be the case, assuring more uniform cooking of virtually any type of food, and minimizing the need to turn the food over on griddle 46 during the cooking process.

Figure 10:
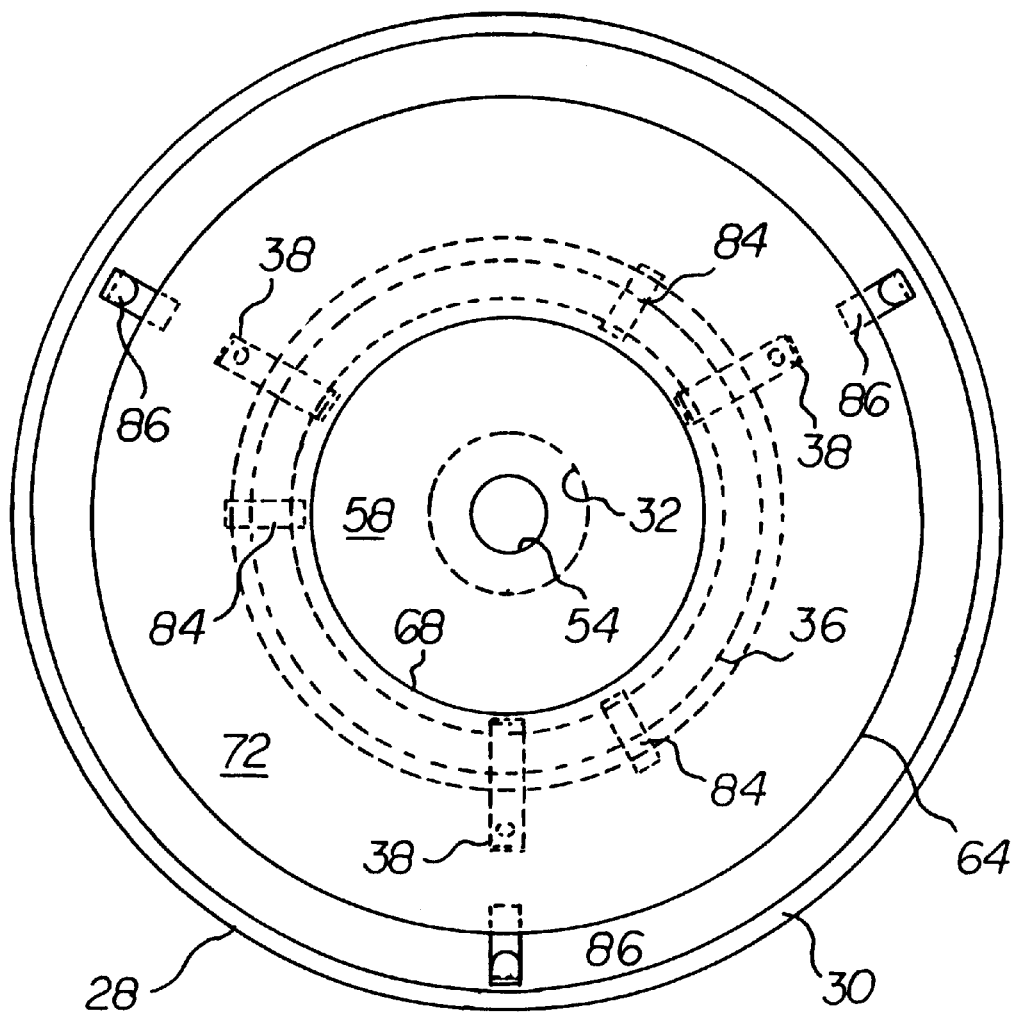
FIG. 10 is a top plan view of the cooking apparatus of FIG. 2 with the food grate 46 omitted for the sake of clarity.

The foregoing hardware components comprising the grease deflector bracket assembly 38, the heat-funnel stabilizing foot bracket assembly 84, and the heat-funnel member edge engagement bracket assembly 86, respectively are employed in sufficient quantity to assure a stable system under expected operating conditions. Although it has been found that three (3) of each component may be employed to good advantage spaced about 120° from each other circumferentially as measured in a transverse plane perpendicular to central axis 44 as depicted in FIG. 10 in connection with the preferred embodiments hereof, it will be appreciated that or more or less than three (3) of each component may be employed to suit individual requirements.

Without limiting the present invention, and merely for purposes of further illustrating a preferred embodiment of the invention, the following is a listing of exemplary dimensions of various parts:

| Part | Inches |
|---|---|
| Diameter of housing at food grate plane: | 21.57 |
| Height of housing along central vertical axis: | 11.93 |
| Wall thickness of housing: | 00.05 |
| Diameter of grease deflector opening at top: | 13.57 |
| Diameter of grease deflector opening at bottom: | 01.38 |
| Height of grease deflector along central vertical axis: | 03.21 |
| Wall thickness of grease deflector: | 00.06 |
| Diameter of heat-funnel opening at top: | 19.69 |
| Diameter of heat-funnel opening at bottom: | 09.25 |
| Height of heat-funnel along central vertical axis: | 02.74 |
| Wall thickness of heat-funnel: | 00.06 |
| Annular gap between housing and top of heat-funnel: | 00.79 |
| Axial gap between heat-funnel and grease deflector: | 00.54 |
| Axial spacing between bottom opening of grease deflector and bottom opening of housing: | 02.07 |
| Axial spacing between burner horizontal center plane and bottom opening of housing: | 03.46 |

The foregoing apparatus is especially adapted for barbecue style cooking, but easily may be modified to accommodate other styles of cooking as well. Thus, turning now to FIG. 12 there is schematically depicted an alternatively preferred embodiment of the cooking apparatus of the present invention wherein the heat-funnel member 42 is inverted and held in its inverted position by a plurality of angle brackets generally indicated by reference sign 150, each of which is suitably affixed to the inside surface of housing 28 substantially as shown.

Turning to FIGS. 13A–13C, each angle bracket 150 includes a first portion 152 terminating in a curved or semi-circular distal end edge 152 and a second portion 154 orthogonally extending from the first portion 152 and also terminating in a curved or semi-circular distal end edge 156. When the second portion 154 is attached to the inside wall surface of housing 28 as by spot-welding for example, the first portion defines an upwardly facing ledge defining a bearing surface 158 thereon with the ledge radially extending into the interior of the housing such that distal end edge points 152 points in a general direction toward imaginary central axis 44. Preferably, three such brackets 150 are employed, spaced about 120° apart as measured in an imaginary transverse plane normal to central axis 44 (only 2 of which are depicted in FIG. 12).

In accordance with the invention, angle brackets 150 are affixed to the inside surface of housing 28 a distance 155 (FIG. 12). At this distance, the diameter of the heat-funnel opening defined by edge 64 is slightly less than the inside transverse dimension of the housing chamber as substantially illustrated in FIG. 12 so that when emplaced the inverted heat-funnel member top edge 64 will loosely engage the confronting housing interior wall surface along its circumferential extent. As a result of this arrangement, substantially all rising heated air from burner 36 is directed through the inverted heat-funnel member 42, i.e. there is little or no annular clearance space or gap between the heat-funnel member edge 64 and the confronting inside circumferentially extending interior wall surface portion of housing 28.

Thus, after inverting the heat-funnel member 42, the rolled top edge 64 thereof may be placed on the bearing surface 158 of each respective bracket 150 and thereby be maintained securely in the position substantially as illustrated in FIG. 12 (see also FIG. 13C). In such position, it will be observed that i) an axial gap or spacing still exists between the inverted top edge 64 of the heat-funnel member 42 and the top edge 50 of the grease deflector member 40; and ii) each heat-funnel stabilizing foot assembly 84 faces upwardly with each bottom flat bearing surface 118 thereon respectively providing a horizontal support surface element adapted to receivingly engage a cooking pan or pot, or more specifically, to engage the corresponding regions on the bottom surface thereof. A preferred cooking pot is shown designated generally by reference sign 160 with the pot having a substantially flat bottom defining bottom surface 161. The cooking pot further may be provided with a pair of opposed hand grips 162 and a circumferentially extending lip 164 on bottom surface 161 to help prevent the pot from too easily sliding off the upwardly facing stabilizing foot bracket assemblies 84. From the foregoing arrangement of FIG. 12, it will be evident that pot 160 may be used to cook food without using the usual domed cover in place because heated air from the burner 36 will rise, enter the heat-funnel and pass directly through opening 68 to impinge directly on the bottom and sidewalls of the pot. In this application, where food is cooked in a pot, instead of being barbecued on a grate or griddle, the grease deflector member 40 largely becomes obviated because food grease, fat and the like normally will be confined to the pot. Spillage, if any, normally be will caught on the inverted underside of the heat-funnel member 42 (facing upwardly in FIG. 12) where eventually any spilled or dripped food particles will be vaporized by the relatively high temperature of this component during an extended cooking phase. It will be appreciated that in using the alternative embodiment of FIGS. 12 and 13A–13C, the normal cover of the housing 28 and the removable food grate 46 are temporarily placed aside or otherwise dispensed with.

As to the manner of usage and operation of the embodiments of the instant invention, the same has already been given, or is apparent from the above disclosure, and accordingly, no further discussion relative to the manner of usage and operation need be provided.

As used herein and in the annexed claims, the terms "grill," "grate," or "griddle" are interchangeable and each usually refers respectively to the part 46 that supports the food being cooked and defines the horizontal cooking surface of the apparatus of the invention. The term "grill" may also be used to mean the entire apparatus, or parts thereof, as in "barbecue grill." Likewise, the terms "grease catcher," "grease collector," "grease deflector," "grease diverter," "grease pan" "drip pan" or "drip shield" are interchangeable and each usually refers respectively to the part 40 that functions to intercept food particles to divert them away from the burner 36 or other heat source.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, instead of using a gas burner as a heat source, other heat sources may be used instead such as charcoal briquets, or electric resistance heaters. Similarly, the housing 28 and its cover may be rectangularly shaped instead of being globular. Many other obvious variations embodied by and within the spirit of the present invention will occur to those of ordinary skill in the art.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. In a cooking apparatus characterized by a housing having a horizontally disposed perforated food support member and a heat source contained within the housing for applying heat to said food support member, the improvement comprising:

an heat-funnel member adapted to direct heated air from said heat source through substantially the entire horizontal extent of said perforated food support member, and a grease deflector member interposed between said heat-funnel member and said heat source.

2. The improvement of claim 1 wherein said heat-funnel member is interposed between said grease deflector member and said horizontally disposed food support member.

3. The improvement of claim 2 wherein said housing has a top portion and a bottom portion and an imaginary central axis extending therebetween, said heat source being located in said housing bottom portion, said perforated food support member being located in said housing top portion, and wherein said heat-funnel member and said grease deflector member are in axially spaced alignment with each other with respect to said central axis.

4. The improvement of claim 3 wherein said grease deflector member has a top opening of circular shape, said top opening having a first diameter, a bottom opening of circular shape, said bottom opening having a second diameter, wherein said first diameter is greater than said second diameter, and wherein said grease deflector member is further characterized by a frusto-conical sidewall extending between said top opening and said bottom opening.

5. The improvement of claim 4 wherein said grease deflector member frusto-conical sidewall has an angle with respect to a horizontal reference of substantially less than 30°.

6. The improvement of claim 5 wherein said angle of said grease deflector member frusto-conical sidewall is 28°.

7. The improvement of claim 4 wherein said heat-funnel member has a top opening of circular shape, said top opening having a third diameter, a bottom opening of circular shape, said bottom opening having a fourth diameter, wherein said third diameter is greater than said second diameter, and wherein said heat-funnel member is further characterized by a frusto-conical sidewall extending between said top opening and bottom opening.

8. The improvement of claim 7 wherein said first diameter is greater than said forth diameter, and wherein said third diameter is greater than said first diameter.

9. The improvement of claim 7 wherein said frusto-conical sidewall of said heat-funnel member has an angle with respect to a horizontal reference of substantially less than 30°.

10. The improvement of claim 9 wherein said angle of said frusto-conical sidewall of said heat-funnel member is 28°.

11. The improvement of claim 1 further including a first bracket assembly for supporting said heat source relative to said housing and for simultaneously supporting said grease deflector member relative to said heat source.

12. The improvement of claim 11 further including a second bracket assembly for supporting said heat-funnel member a predetermined spacing from said grease deflector member.

13. The improvement of claim 11 wherein said first bracket assembly comprises a housing wall attachment section, a heat source support section, and a grease deflector member supporting section.

14. The improvement of claim 13 wherein said grease deflector member has a top opening of circular shape, a bottom opening of circular shape, a frusto-conical sidewall extending between said top opening and said bottom opening, wherein a radially outwardly extending circumferential lip surrounds said top opening, and wherein said first bracket assembly grease deflector member supporting section is a finger having a free distal edge, said free distal edge of said finger being adapted to engage said lip to support said grease deflector member relative to said heat source.

15. The improvement of claim 12 wherein said second bracket assembly comprises a heat-funnel member attachment portion, an intermediate leg portion, and an angularly extending foot portion joined to said intermediate portion, and wherein said foot portion defines a bottom flat bearing surface.

16. The improvement of claim 15 wherein said heat-funnel member has a top opening of circular shape, a bottom opening of circular shape, a frusto-conical sidewall extending between said top opening and said bottom opening, wherein a radially outwardly extending circumferential lip surrounds said top opening, and wherein said second bracket assembly is attached to said heat-funnel member proximal to said bottom opening such that said foot portion joined to said intermediate portion is adapted to engage said grease deflector member with said foot portion bottom flat bearing surface so as to maintain said heat-funnel member separated from said grease deflector by said predetermined distance.

17. The improvement of claim 16 wherein said predetermined distance is an air gap, said air gap defining a passage for heated air emanating from said heat source, said passage enabling said heated air to flow through said heat-funnel member bottom opening and said heat-funnel member top opening to directly impinge upon said food support member.

18. The improvement of claim 12 further including a third bracket assembly, said third bracket assembly adapted to be affixed to said housing and to engage said heat-funnel member interiorly of said housing to help support said heat-funnel member said predetermined spacing from said grease deflector member.

19. The improvement of claim 18 wherein said third bracket assembly further defines a support surface for supporting said food support member.

20. A cooking apparatus comprising in combination:

a housing, said housing defining an interior space and having a top open end and an opposed bottom end, a horizontally disposed grill for supporting food proximal to said top open end of said housing, a heat source disposed in said interior space in said bottom portion of said housing, said heat source comprising an annular-shaped burner member, a drip pan overlying said annular-shaped member, a heat-funnel overlying said drip pan, said heat-funnel having a first opening proximal to said drip pan, said first heat-funnel opening having a first transverse extent, said heat-funnel having a second opening proximal to said horizontally disposed grill, said second heat-funnel opening having a second transverse extent, said second transverse extent being substantially greater than said first transverse extent, and means for supporting said drip pan and said heat funnel a predetermined spaced distance from each other to form an air gap therebetween, said air gap being in communication with said heat-funnel first opening such that heated air from said burner is adapted to flow past said overlying drip pan, enter said first opening of said heat-funnel and flow through said second opening of said heat-funnel to impinge upon said horizontally disposed grill.

21. The apparatus of claim 20 wherein said drip pan has a first opening interposed between said annular-shaped burner member and said heat-funnel, said drip pan first opening having a third transverse extent, said drip pan having a second opening proximal to said opposed bottom end of said housing, said drip pan second opening having a fourth transverse extent, said first transverse extent of said heat-funnel first opening being substantially greater than said third transverse extent of said drip pan first opening.

22. The apparatus of claim 20 wherein said means for supporting said drip pan and said heat funnel includes means for supporting said annular-shaped burner member in the bottom portion of said housing and further includes means for supporting said drip pan in overlying disposition relative to said annular-shaped burner member.

23. The apparatus of claim 20 wherein said means for supporting said drip pan and said heat funnel includes leg and foot means on said heat-funnel proximal to said heat-funnel first opening, said leg and foot means having a longitudinal extent sufficient to span said predetermined distance and engage said drip pan through said air gap.

24. The apparatus of claim 20 wherein said means for supporting said drip pan and said heat funnel includes bracket means affixed to said housing for engaging said heat-funnel member proximal to said second heat-funnel opening having a second transverse extent and further includes means for removably supporting said grill in said horizontal disposition.

25. The apparatus of claim 23 further including:

means for supporting said heat-funnel in an inverted position within said housing, said means including ledge means affixed to said housing interiorly thereof, and a pot member adapted to be supported by said leg and foot means when said grill is removed.

26. The apparatus of claim 25 wherein said ledge means is located on said housing in a position enabling said heat funnel to loosely engage said housing proximal to said second opening having a second transverse extent when said heat funnel is in said inverted position.

* * * * *